(12) United States Patent
Bae

(10) Patent No.: US 9,670,610 B2
(45) Date of Patent: Jun. 6, 2017

(54) APPARATUS AND METHOD OF DETECTING DROP AND/OR DETACHMENT OF A WALL MOUNTED DRUM TYPE WASHING MACHINE

(71) Applicant: Dongbu Daewoo Electronics Corporation, Seoul (KR)

(72) Inventor: Sang Ill Bae, Incheon (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 563 days.

(21) Appl. No.: 14/184,484

(22) Filed: Feb. 19, 2014

(65) Prior Publication Data

US 2015/0176183 A1    Jun. 25, 2015

(51) Int. Cl.
| | |
|---|---|
| G01R 1/20 | (2006.01) |
| D06F 37/42 | (2006.01) |
| G01B 11/14 | (2006.01) |
| G01B 11/26 | (2006.01) |
| G01B 7/30 | (2006.01) |
| D06F 39/00 | (2006.01) |
| D06F 39/12 | (2006.01) |

(52) U.S. Cl.
CPC .......... *D06F 37/42* (2013.01); *D06F 39/001* (2013.01); *D06F 39/125* (2013.01); *G01B 7/30* (2013.01); *G01B 11/14* (2013.01); *G01B 11/26* (2013.01)

(58) Field of Classification Search
CPC ...................................................... D06F 37/42
USPC ......................................................... 307/154
See application file for complete search history.

(56) References Cited

U.S. PATENT DOCUMENTS 5,090,220 A * 2/1992 Fukuzawa ............... D06F 23/00
                                                                248/550
8,181,493 B2 * 5/2012 May ....................... G01D 5/145
                                                                324/207.2
(Continued)

FOREIGN PATENT DOCUMENTS

JP        2010119417        6/2010
JP        2010-213743       9/2010
(Continued)

OTHER PUBLICATIONS

The extended European Search Report dated Jun. 8, 2015, issued in corresponding European Patent Application No. 14177164.2.

*Primary Examiner* — Jared Fureman
*Assistant Examiner* — Esayas Yeshaw

(57) ABSTRACT

The present disclosure relates to an apparatus and a method of detecting when a wall mounted drum type washing machine drops, slips, tilts or detaches from the wall, in which the apparatus includes a horizontality detecting sensor configured to output a sensor value corresponding to a horizontal inclination of a main body of a washing machine; a verticality detecting sensor configured to output a sensor value corresponding to a vertical inclination of the main body of the washing machine; and a controller configured to determine whether the main body of the washing machine has dropped, slips, tilts or detaches from the wall by receiving sensor values from the horizontality detecting sensor and the verticality detecting sensor, and blocking power to the washing machine when the main body of the washing machine dropped, slipped, tilted or detached from the wall.

20 Claims, 3 Drawing Sheets

(56) References Cited

U.S. PATENT DOCUMENTS

| | | | |
|---|---|---|---|
| 2007/0193047 A1* | 8/2007 | Chae | G01C 9/06 33/366.11 |
| 2009/0145001 A1* | 6/2009 | Oh | D06F 58/22 34/282 |
| 2010/0011515 A1* | 1/2010 | Rhodes | D06F 33/02 8/159 |
| 2012/0089258 A1* | 4/2012 | Wong | D06F 35/007 700/279 |

FOREIGN PATENT DOCUMENTS

| | | |
|---|---|---|
| KR | 10-1999-0027768 | 4/1999 |
| KR | 20050116607 | 12/2005 |
| KR | 20130070804 | 12/2011 |
| KR | 10-2013-0112671 | 10/2013 |

\* cited by examiner

APPARATUS AND METHOD OF DETECTING DROP AND/OR DETACHMENT OF A WALL MOUNTED DRUM TYPE WASHING MACHINE

CROSS-REFERENCE TO RELATED APPLICATIONS

This application is based on and claims priority from Korean Patent Application No. 10-2013-0161292, filed on Dec. 23, 2013, with the Korean Intellectual Property Office, the disclosure of which is incorporated herein in its entirety by reference.

TECHNICAL FIELD

The present disclosure relates to an apparatus and a method of detecting when a wall mounted drum type washing machine, and particularly, to an apparatus and a method of detecting when a wall mounted drum type washing machine drops, detaches and/or otherwise becomes loose from the wall, which may reduce or block power and stops the operation of a drum type washing machine in such a situation. This may prevent a dangerous situation from arising after the drop, detachment and/or other loosening from the wall occurs.

BACKGROUND

A wall mounted drum type washing machine is a washing machine that has a structure attached to a wall for use in small and/or narrow spaces.

FIG. 1 illustrates an external appearance of a conventional wall mounted drum type washing machine.

Referring to FIG. 1, the wall mounted drum type washing machine 1 includes a main body 60 having a cylindrical washing tub therein, a door 50 that opens and closes at a front side of the main body 60, and an attachment member 10 at a rear side of the main body 60 for attachment to a wall.

A washing drum is inside the cylindrical washing tub, and the washing drum is rotated by a forward and reverse motor. A pulley or wheel is on a shaft of the washing drum and another pulley or wheel is on a shaft of the forward and reverse motor. The pulleys may be connected by a power transmission belt to transmit power. A depth of the washing drum is smaller than a diameter thereof, so that a front-to-rear length of the main body 60 of the washing machine is relatively short. A key input unit is at a lower side of a front surface of the main body 60 of the washing machine, so that the user may easily manipulate the main body of the washing machine when the washing machine on the wall.

As described above, the wall mounted drum type washing machine is fixed or attached on a wall. However, if the wall mounted drum type washing machine is not properly fixed or attached to the wall, or the wall and/or the installation components are defective, the washing machine may drop or become detached, and an accident may occur.

However, in the wall mounted drum type washing machine in the related art, even though the washing machine has dropped or become detached, the wall mounted drum type washing machine may still receive power. Thus, a potential risk of an electric shock or fire may occur.

SUMMARY

The present disclosure has been made in an effort to provide an apparatus and a method of detecting when a wall mounted drum type washing machine drops or becomes detached, thus preventing a potential risk of fire, electrical shock, or causing injury to an individual.

Exemplary embodiments of the present disclosure provide an apparatus for detecting when a wall mounted drum type washing machine drops or detaches, including a horizontality detecting sensor configured to output a sensor value corresponding to a horizontal inclination of a main body of the washing machine; a verticality detecting sensor configured to output a sensor value corresponding to a vertical inclination of the main body of the washing machine; and a controller configured to determine whether the main body of the washing machine has dropped, slipped, tilted or detached from the wall by receiving the sensor values from the horizontality detecting sensor and the verticality detecting sensor, and block power to the washing machine when the main body of the washing machine has dropped, slipped, tilted or detached from the wall.

Exemplary embodiments of the present disclosure provide an apparatus for detecting when a wall mounted drum type washing machine drops or detaches, including an optical sensor below a main body of the washing machine, configured to irradiate light toward a bottom surface, receive light reflected from the bottom surface, and output a sensor value corresponding to the received light; and a controller configured to determine whether the main body of the washing machine has dropped, slipped, tilted or detached from the wall from the sensor value, and block power to the washing machine when the main body of the washing machine dropped, slipped, tilted or detached from the wall.

Other exemplary embodiment of the present disclosure provide a method of detecting when a wall mounted drum type washing machine, including receiving a first sensor value corresponding to a horizontal inclination of a main body of the washing machine and a second sensor value corresponding to a vertical inclination of the main body of the washing machine from inclination sensors (e.g., first and second inclination sensors); confirming whether the first sensor value and the second sensor value are in a predetermined range, and determining whether the main body of the washing machine has dropped, slipped, tilted or detached from the wall; and blocking power to the washing machine when it is determined that the main body of the washing machine has dropped, slipped, tilted or detached from the wall (e.g., when the first and/or second sensor values are not within the predetermined range).

Exemplary embodiments of the present disclosure provide a method of detecting when a wall mounted drum type washing machine drops, slips, tilts or detaches from the wall, including receiving a sensor value corresponding to reflected light from a bottom surface (e.g., below the washing machine) from an optical sensor; confirming whether the sensor value is within a predetermined range, and determining whether a main body has dropped, slipped, tilted or detached from the wall (e.g., based on the sensor value); and blocking power to the washing machine when it is determined that the main body of the washing machine has dropped, slipped, tilted or detached from the wall.

As described above, according to exemplary embodiments of the present disclosure, it may be possible to prevent dangerous situations, such as electrical shock or fire, or other injury to an individual.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
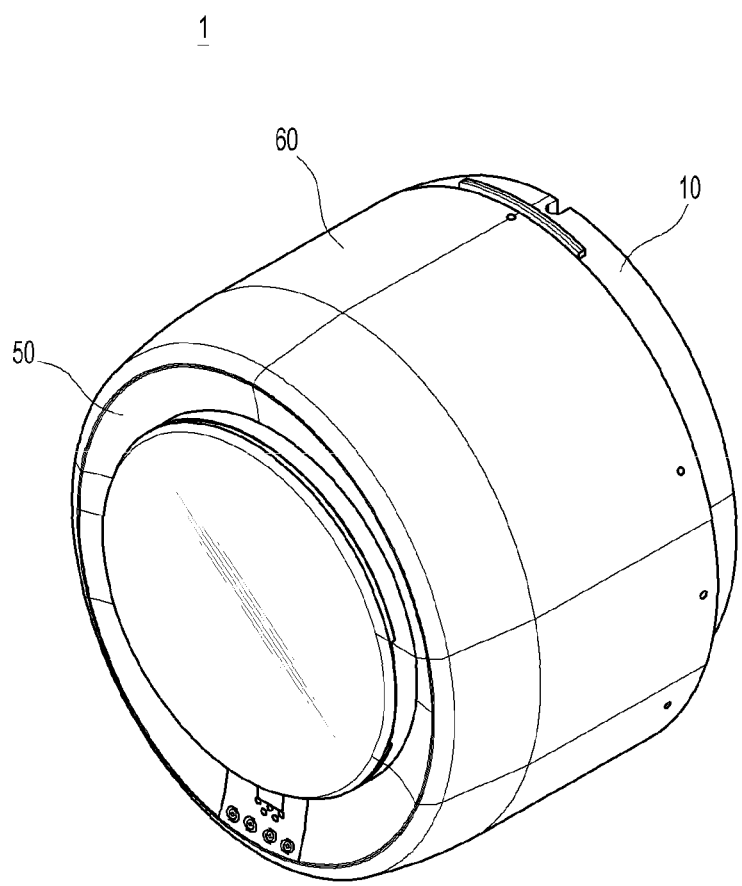
FIG. 1 is a view illustrating an external appearance of a conventional wall mounted drum type washing machine.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference the accompanying drawings. A configuration of the present disclosure and an operation and an effect according to the configuration of the present disclosure will be clearly understood by the detailed description below.

In the following description, the same elements will be designated by the same reference numerals although the elements are illustrated in different drawings, and a detailed explanation of known related constitutions may be omitted so as to avoid unnecessarily obscuring the subject matter of the present disclosure.

Figure 2:
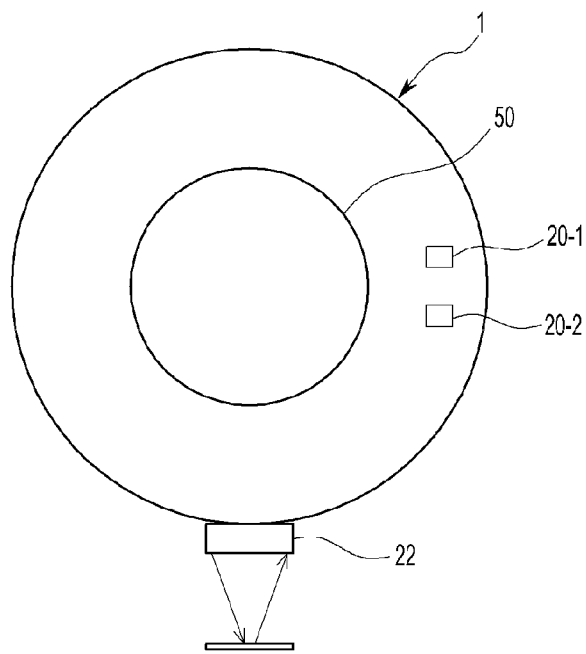
FIG. 2 is a view schematically illustrating an installation structure of an apparatus for detecting when a wall mounted drum type washing machine drops, slips, tilts or detaches from the wall, according to exemplary embodiments of the present disclosure.

FIG. 2 schematically illustrates an installation structure of an apparatus for detecting when a wall mounted drum type washing machine drops, slips, tilts or detaches from the wall, according to exemplary embodiments of the present disclosure.

Referring to FIG. 2, a plurality of sensors 20 and 22 for detecting when a main body of the washing machine drops, slips, tilts or detaches from the wall. In exemplary embodiments of the present disclosure, a horizontality detecting sensor 20-1, a verticality detecting sensor 20-2, and an optical sensor 22 can detect when the main body of the washing machine drops, slips, tilts, or detaches from the wall.

The horizontality detecting sensor 20-1 and the verticality detecting sensor 20-2 may be at any position of the main body of the washing machine, and are in a side portion of the main body of the washing machine in exemplary embodiments of the present disclosure.

The optical sensor 22 irradiates light towards a bottom surface (e.g., a horizontal reflective surface below the washing machine 1) and receives light reflected from the bottom surface, and thus is below the main body of the washing machine. Typically, the sensor receives most (e.g., at least 90%) of the reflected light. Thus, when the amount of the reflected light sensed by the sensor drops significantly below the typical or default value (e.g., 10-80%, and in one example, 50%), the washing machine is determined to have dropped, tilted, or separated from the wall.

FIG. 2 illustrates a case in which the horizontality detecting sensor 20-1, the verticality detecting sensor 20-2, and the optical sensor 22 are on or in the wall mounted drum type washing machine. However, the apparatus for detecting when the wall mounted drum type washing machine drops, slips, tilts, or detaches may be configured by installing only the horizontality detecting sensor 20-1 and the verticality detecting sensor 20-2, or installing only the optical sensor 22.

Alternatively, exemplary embodiments of the present invention may comprise an inverted laser-based reflection system configured to detect whether the washing machine has dropped, slipped, tilted or detached from the wall similar to FIG. 2, but the optical sensor 22 and the bottom surface are reversed. The laser-based reflection system comprises an LED or small laser placed on the wall under the washing machine, a horizontal reflective device on a lowermost edge or surface of the washing machine, and a detector next to the LED or small laser configured to receive the reflected light. The detector determines if there is a change in the position of the reflective device or a change or tilt in the edge or angle of the washing machine, similar to the reflection-based system described above.

Figure 3:
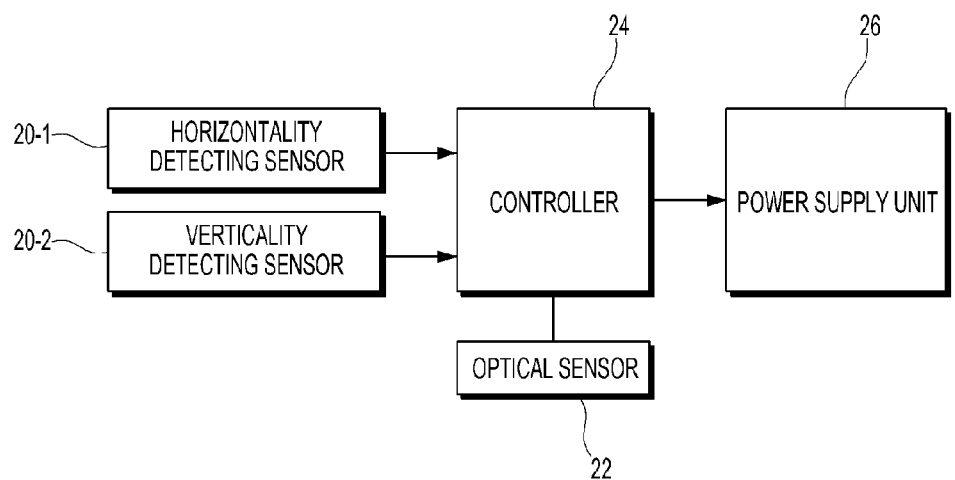
FIG. 3 is an internal configuration diagram schematically illustrating an apparatus for detecting when the wall mounted drum type washing machine drops, slips, tilts or detaches from the wall, according to exemplary embodiments of the present disclosure.

FIG. 3 schematically illustrates an internal configuration of the apparatus for detecting when the wall mounted drum type washing machine drops, slips, tilts, or detaches, according to exemplary embodiments of the present disclosure.

Referring to FIG. 3, the apparatus for detecting when the wall mounted drum type washing machine drops, slips, tilts, or detaches includes the horizontality detecting sensor 20-1, the verticality detecting sensor 20-2, the optical sensor 22, a controller 24, and a power supply unit 26.

The horizontality detecting sensor 20-1 and the verticality detecting sensor 20-2 include a conductive fluid therein, so that when an inclination of the conductive fluid changes according to an inclination of the main body of the washing machine, an electric signal is output according to the inclination or change in inclination of the conductive fluid. Through the aforementioned operation principle, the horizontality detecting sensor 20-1 outputs a sensor value corresponding to a horizontal inclination of the main body of the washing machine, and the verticality detecting sensor 20-2 outputs a sensor value corresponding to a vertical inclination of the main body of the washing machine.

The optical sensor 22 comprises a light emission unit, such as an LED, and a light reception unit, such as a photodiode, and operates by a principle that light emitted from the light emission unit is reflected so that the light reception unit receives the reflected light. Through the aforementioned operation principle, the optical sensor 22 irradiates light towards the bottom surface, receives light reflected from the bottom surface, and outputs a sensor value corresponding to the received light.

The controller 24 receives the sensor values from the horizontality detecting sensor 20-1, the verticality detecting sensor 20-2, and the optical sensor 22 to determine whether the main body of the washing machine has dropped, slipped, tilted, or detached from the wall, and if it is determined that the main body of the washing machine has dropped, slipped, tilted, or detached, the controller 24 blocks power to the washing machine by outputting a power supply blocking signal to the power supply unit 26.

The power supply unit 26, continuously supplies electric power to the washing machine in a normal state, and blocks the power to the washing machine when it receives the power supply blocking signal from the controller 24.

Figure 4:
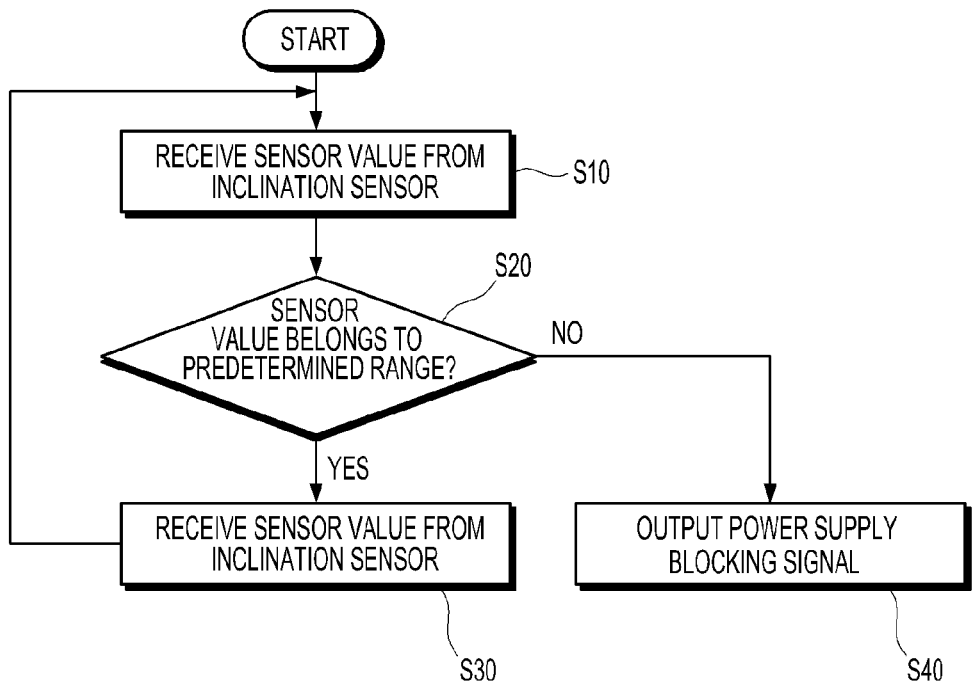
FIG. 4 is a flowchart illustrating an exemplary operation process of the apparatus for detecting when the wall mounted drum type washing machine drops, slips, tilts or detaches from the wall, according to exemplary embodiments of the present disclosure.

FIG. 4 illustrates an operation process of the apparatus for detecting when the wall mounted drum type washing machine drops, slips, tilts, or detaches from the wall, according to exemplary embodiments of the present disclosure.

Referring to FIG. 4, the controller 24 first receives sensor values from the inclination sensors, such as the horizontality detecting sensor 20-1 and the verticality detecting sensor 20-2 (S10). The controller 24 receives a first sensor value corresponding to a horizontal inclination of the main body of the washing machine from the horizontality detecting sensor 20-1, and a second sensor value corresponding to a vertical inclination of the main body of the washing machine from the verticality detecting sensor 20-2.

The controller 24 confirms whether the first sensor value and the second sensor value are within a predetermined range, and determines whether the main body of the washing machine has dropped, slipped, tilted, or detached from the wall (e.g., in a drop situation) (S20) from the first and second sensor values. Typically, the inclination sensors have a standard or default conductivity when level. When the conductivity changes by more than a predetermined amount (e.g., 5% or more, 10% or more, 20% or more, etc.), the washing machine is determined to have dropped, slipped, tilted, or detached from the wall.

When the first sensor value and the second sensor value are within the predetermined range, the controller 24 maintains a normal operation (S30). However, when the first sensor value and/or the second sensor value are not within the predetermined range, the controller 24 outputs a power supply blocking signal to the power supply unit 26 to block power supplied to the washing machine (S40).

In the meantime, the controller 26 may additionally receive a third sensor value from the optical sensor, together with or separate from the first sensor value and the second sensor value of the inclination sensors. The controller 26 may confirm whether the third sensor value is within a predetermined range, and determine whether the main body of the washing machine has dropped, slipped, tilted, or detached from the wall based on the third sensor value.

The controller 26 may receive only the sensor value of the optical sensor 22 and determine whether the main body of the washing machine has dropped, slipped, tilted, or detached from the wall from the optical sensor value.

An algorithm for determining whether the main body of the washing machine has dropped, slipped, tilted, or detached from the wall may be different according to the usage of the sensor.

When only the inclination sensors are used, and when both of the first sensor value and the second sensor value are within the predetermined range, the controller 26 may determine that the main body of the washing machine is properly fixed to the wall. When either of the first sensor value and the second sensor value is not within the predetermined range, the controller 26 may determine that the main body of the washing machine has dropped, slipped, tilted, or detached from the wall.

When the inclination sensors and the optical sensor are simultaneously used, and when all of the first sensor value to the third sensor value is in the predetermined range, the controller 26 may determine that the main body of the washing machine is in a normal situation or properly connected to the wall. When any one of the first sensor value to the third sensor value is not within the predetermined range, the controller 26 may determine that the main body of the washing machine has dropped, slipped, tilted, or detached from the wall.

When only the optical sensor is used, and when the third sensor value is within the predetermined range, the controller 26 may determine that the main body of the washing machine is in a normal situation or properly connected to the wall. When the third sensor value is not within the predetermined range, the controller 26 may determine that the main body of the washing machine has dropped, slipped, tilted, or detached from the wall.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for detecting when a wall mounted drum type washing machine drops, slips, tilts or detaches from the wall, comprising:
   a horizontality detecting sensor configured to output a sensor value corresponding to a horizontal inclination of a main body of a washing machine;
   a verticality detecting sensor configured to output a sensor value corresponding to a vertical inclination of the main body of the washing machine; and
   a controller configured to determine whether the main body of the washing machine has dropped, slipped, tilted or detached from the wall by receiving sensor values from the horizontality detecting sensor and the verticality detecting sensor, and block power to the washing machine when the main body of the washing machine dropped, slipped, tilted or detached from the wall.

2. The apparatus of claim 1, further comprising:
   an optical sensor configured to irradiate light toward a bottom surface, receive light reflected from the bottom surface, and output a sensor value corresponding to the received light, wherein the controller receives a sensor value from the optical sensor and determines whether the main body of the washing machine has dropped, slipped, tilted or detached from the wall.

3. The apparatus of claim 2, wherein when the amount of the reflected light sensed by the sensor decreases by at least a predetermined value, the washing machine is determined to have dropped, tilted, or separated from the wall.

4. The apparatus of claim 3, wherein the predetermined value is 10-80% of a typical or default value.

5. The apparatus of claim 1, wherein when a current passing through the horizontality detecting sensor or the verticality detecting sensor decreases by at least a predetermined value, the washing machine is determined to have dropped, tilted, or separated from the wall.

6. The apparatus of claim 5, wherein the predetermined value is 5-20% of a typical or default value.

7. The apparatus of claim 1, further comprising a laser-based reflection system configured to detect whether the washing machine has dropped, slipped, tilted or detached from the wall.

8. The apparatus of claim 6, wherein the laser-based reflection system comprises an LED or laser on the wall under the washing machine, a horizontal reflective device on a lowermost edge or surface of the washing machine, and a detector next to the LED or laser configured to receive the reflected light.

9. The apparatus of claim 2, wherein the horizontal detecting sensor, the vertical detecting sensor, and the optical sensor are in or on the wall mounted drum type washing machine.

10. The apparatus of claim 1, wherein the horizontal detecting sensor and the vertical detecting sensor each comprise a conductive fluid therein.

11. The apparatus of claim 1, further comprising a tub, a drum and a power supply unit.

12. An apparatus for detecting when a wall mounted drum type washing machine drops, slips, tilts or detaches from the wall, comprising:
   an optical sensor at a lower side or surface of a main body of the washing machine, and configured to irradiate light toward a bottom surface, receive light reflected from the bottom surface, and output a sensor value corresponding to the received light; and
   a controller configured to determine whether the main body of the washing machine has dropped, slipped, tilted or detached from the wall from the sensor value, and block power to the washing machine when the main body of the washing machine has dropped, slipped, tilted or detached from the wall.

13. The apparatus of claim 12, wherein the bottom surface comprises a horizontal reflective surface below the washing machine.

14. The apparatus of claim 12, wherein the optical sensor comprises a light emission unit and a light reception unit.

15. A method of detecting when a wall mounted drum type washing machine drops, slips, tilts or detaches from the wall, comprising:
   receiving a first sensor value corresponding to a horizontal inclination of a main body of the washing machine and a second sensor value corresponding to a vertical inclination of the main body of the washing machine from inclination sensors in or on the washing machine;
   confirming whether the first sensor value and the second sensor value are within a predetermined range, and determining whether the main body of the washing machine has dropped, slipped, tilted or detached from the wall; and
   blocking power to the washing machine when it is determined that the main body of the washing machine has dropped, slipped, tilted or detached from the wall.

16. The method of claim 15, wherein the inclination sensors comprise a horizontality detecting sensor and a verticality detecting sensor.

17. The method of claim 15, further comprising:
   receiving a third sensor value from an optical sensor corresponding to reflected light from a bottom surface; and
   confirming whether the third sensor value is within a second predetermined range, and determining whether the main body has dropped, slipped, tilted or detached from the wall.

18. The method of claim 17, further comprising irradiating light towards the bottom surface, receiving light reflected from the bottom surface, and outputting the third sensor value corresponding to the received light.

19. A method of detecting when a wall mounted drum type washing machine drops, slips, tilts or detaches from the wall, comprising:
   receiving a sensor value corresponding to light reflected from a bottom surface from an optical sensor;
   confirming whether the sensor value is within a predetermined range, and determining whether a main body has dropped, slipped, tilted or detached from the wall; and
   blocking power to the washing machine when it is determined that the main body of the washing machine has dropped, slipped, tilted or detached from the wall.

20. The method of claim 19, wherein the bottom surface comprises a horizontal reflective surface below the washing machine.

* * * * *